Sept. 7, 1937.　　　　　R. J. TENNIS　　　　　2,092,481
TIRE SPREADER
Filed July 1, 1936　　　　　2 Sheets-Sheet 1
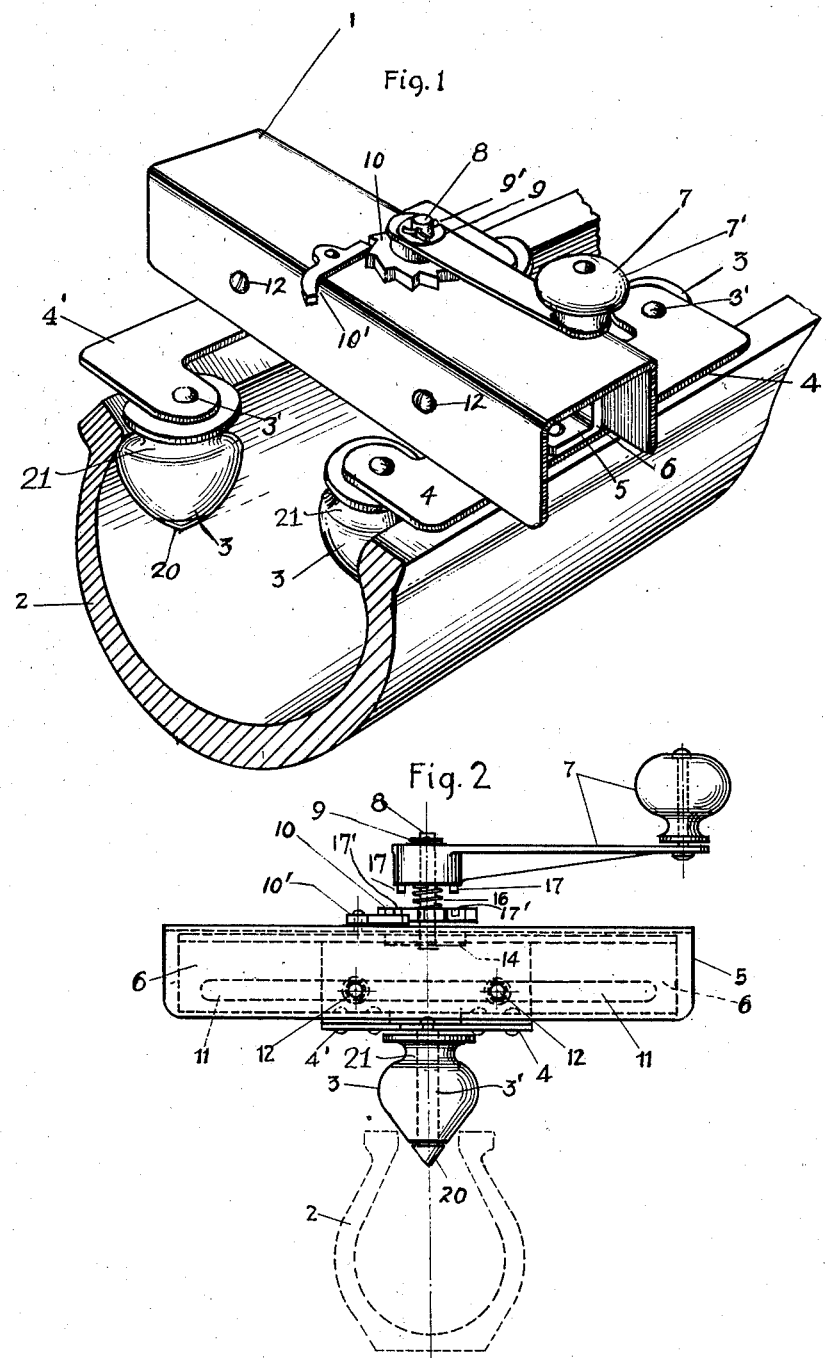
INVENTOR.:
Robert J. Tennis,
BY
His ATTORNEY.

Sept. 7, 1937.  R. J. TENNIS  2,092,481
TIRE SPREADER
Filed July 1, 1936  2 Sheets-Sheet 2

INVENTOR:
Robert J. Tennis,
BY
Wwenarton,
His ATTORNEY.

Patented Sept. 7, 1937

2,092,481

UNITED STATES PATENT OFFICE 2,092,481

TIRE SPREADER

Robert J. Tennis, Montclair, N. J.

Application July 1, 1936, Serial No. 88,272

4 Claims. (Cl. 152—27)

This invention relates to devices for spreading the beads of the shoe of a pneumatic tire either to permit of the inspection of the interior thereof or for facilitating the insertion of an inner tube thereinto and has for its particular objects the provision of a device for such purposes which is sturdy, compact, cheap and highly efficient, as well as having other advantages as hereinafter set forth.

Heretofore, as I am well aware, it has been proposed, as set forth in Patents Nos. 1,627,500 and 1,622,661, to provide tire spreader devices which were equipped with rollers whereby after the beads of a tire shoe had been spread apart into an open position, the device could be manually propelled, peripherally of the shoe. However, these devices necessitated the employment of separate spreader tools or so-called tire iron for insertion of the device into a shoe wherein the slot between beads was normally of extremely narrow width and considerable power and effort was required to accomplish the desired spreading of the beads of the shoe with respect to each other. My improved tire spreader device, however, is so constructed as to obviate the necessity for employing separate tools for the insertion of same into a tire shoe, irrespective of how narrow the slot between the beads may be and requires but comparatively little effort to propel the same peripherally of the expanded tire. The construction of my improved device, whereby these and other objects are obtained, is set forth in the following description and drawings forming a part thereof, in which latter Fig. 1 is a perspective view of my improved tire spreader applied to a tire shoe, such spreader being shown in an open or spread position;

Fig. 2 is a front elevation of said spreader showing the same about to be inserted into a tire shoe which it is desired to spread;

Figure 3:
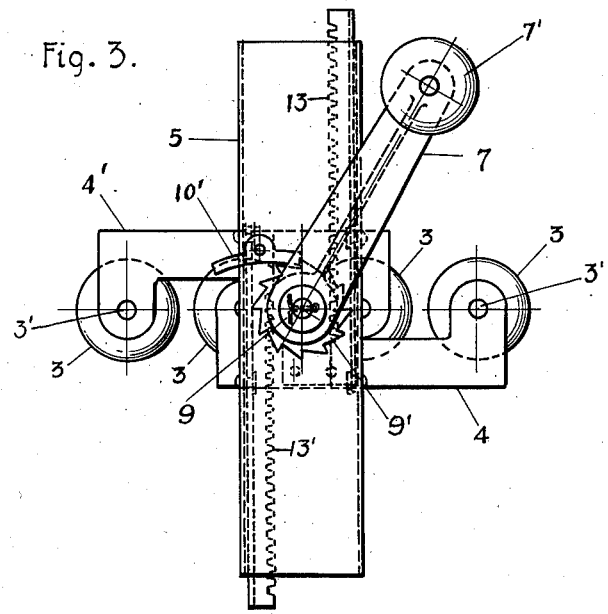
Fig. 3 is a plan view of the tire spreader shown in Fig. 1, isolated, but showing the same in a closed position.
Figure 4:
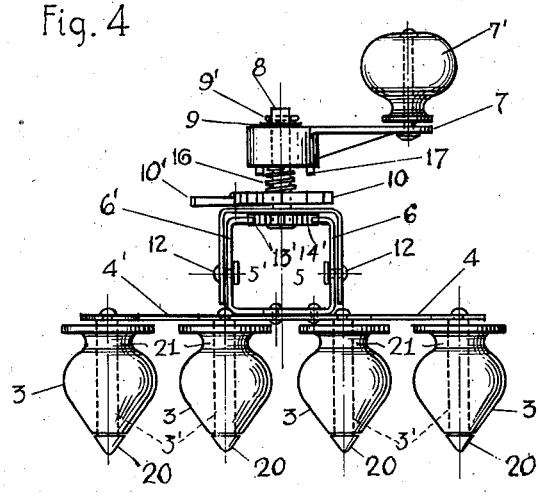
Fig. 4 is an elevation of the tire spreader shown in Fig. 3.

Referring to the drawings and construction shown therein, the reference numeral 1 designates a channel-shaped housing or rack-supporting means of my improved tire spreader, and 2 a shoe which has been expanded or spread by employing the same. Said spreader is equipped with inversely conical or top-shaped rollers 3 mounted on stud shafts or journal members 3' which are swedged or riveted at their upper ends to U-shaped spring arms or plates 4, 4' the latter being in turn riveted or welded to integral laterally extending lugs or feet 5, 5' that are respectively formed on elongated right and left-hand rack members 6, 6' which are slidably mounted, as hereinafter described, in said housing. Each of said rollers 3 is preferably provided with a peripheral bead-receiving groove adjacent the upper end thereof for the reception of the bead of a tire with which said roller is caused to contact.

A crank 7, which is provided with a handle 7', is loosely mounted on the cylindrical outer end of a crank shaft 8, the same being retained against escape therefrom by a washer 9 and cotter pin 9'. A ratchet 10 is mounted on said shaft being positioned intermediate the bottom face of the hub of the crank arm and the top of said housing, said ratchet being rigidly secured to said shaft by means of a pin or otherwise so as to rotate therewith. A spring-pressed pawl 10' is mounted on said housing in such a manner as to permit of a clock-wise rotation only of said ratchet, as viewed from above, when said pawl and ratchet are normally in engagement with each other and the crank arm is rotated to effect the spreading of the plates 4, 4' with respect to each other, while admitting of anti-clockwise rotation of said shaft when the pawl 10' is released from engagement with the ratchet teeth.

Said racks are provided with longitudinal slots 11 through which project the shanks of guide bolts 12 that are mounted on the side of said housing and thereby the extent of the longitudinal sliding movement of said racks is limited and the escape of the same from within the housing 1 is prevented. As shown, said racks are approximately of the same height as the inside faces of the longitudinal sides of said housing with which faces they are maintained in sliding engagement by means of the guide bolts 12. Said rack members are offset at the top thereof and the marginal longitudinal margins of such offset portions are formed into rack elements 13. A pinion 14 is rigidly secured to the lower end of such shaft 8 and is so positioned intermediate said racks that the teeth 14' thereof permanently engage the rack elements 13.

In order to admit of the relative rotation of the crank arm with respect to the shaft 8 and the ratchet 10 carried thereby when the latter is released from engagement with the pawl 10', a coil spring 16 is interposed between the outer face of said ratchet and the adjacent face of the hub of the crank arm and two pins 17 are formed on said crank arm, the same constituting a clutch mechanism which is adapted, when downward pressure is exerted on the crank arm, to project into recesses 17' formed on the top of said ratchet. As a consequence said crank arm and said ratchet are normally held out of engagement with each other by the action of said spring.

The lower ends 20 of the stud shafts 3' are enlarged so as to retain the rollers 3 thereon and preferably the same are of conical configuration to facilitate the entrance thereof into the slots between opposing beads of tire shoes wherein such beads are normally in close juxtaposition to each other.

Preferably the plates 4 are formed of spring steel so as to admit of the slight warping thereof to conform to the periphery of the beads and thereby allow the rollers to hug the inner faces of such beads when the spreader device is operated to effect the spreading of such beads with respect to each other as well as during the manual propulsion of the device peripherally of the spread tire.

As shown, the rollers each have a peripheral groove 21 formed thereon adjacent the upper end thereof which are adapted to receive the beads of the shoe and prevent the accidental escape of the rollers at all times during the operation of the device.

Among the various advantages of my improved tire spreader are its sturdy and compact construction, the ease and effectiveness of its operation and the fact that there is no possibility of the accidental escape of the device from the tire shoe during the spreading of the beads thereof, with the consequence that the operator is at all times protected against injury. Furthermore, due to the aforesaid clutch mechanism which is provided between the crank 7 and ratchet 10, the crank 7 is permitted to rotate freely on the shaft 8 once the pressure exerted thereon by the hand of the operator is released and thereby, when the pawl 10' is "kicked" out to release the ratchet, the inherent pressure exerted by the expanded shoe effects the immediate closing of the device without any danger to the operator.

As is evident from the construction of my improved tire spreader, the same can be readily inserted into a tire shoe irrespective of how close the beads may lie to each other when said shoe is in an unexpanded or normal condition owing to the fact that all of the rollers are in alinement, transversely, of the longitudinal axis of the housing, when the spreader is in a closed position and also owing to the conical configuration of such rollers. Furthermore, once the tire shoe has been spread by means of my improved spreader it can be easily propelled peripherally along the shoe by the operator to permit of the inspection of the inner wall of the shoe or the insertion of an inner tube into the shoe.

In some cases it may be found advantageous, particularly where my improved tire spreader is designed for use on the shoes of truck tires to afford guides on the bottom of the housing for the rack members 6 and 6' and also to longitudinally strengthen the vertical sides of said housing by forming integral inwardly extending right-angle flanges along the bottom of the vertical sides of said housing which would project between the bottom of the lugs 5 and 5' of the respective rack members and the top of the adjacent plates 4, 4' to which said rack members are secured. Such flanged guides would not only effectively support the rack members and consequently relieve the guide bolts 12 from undue shearing strains, but would also effectively strengthen the said sides of the housing, particularly against longitudinal stresses.

While I have illustrated a preferred embodiment of my invention, it is to be understood that various modifications in the structure thereof within the scope of the appended claims may be made without departing from the spirit of my invention.

Having thus described my invention, what I claim and desire to obtain by United States Letters Patent is:—

1. In a tire spreading device, the combination comprising a frame, a plurality of opposing rack members slidably secured thereto, a pinion interposed intermediate said rack members and permanently engaging the same, roller-supporting means carried by each of said rack members, a plurality of rollers secured to each of said roller-supporting means, a shaft secured to said pinion, a crank mounted on said shaft and adapted to effect rotation of said pinion, a ratchet wheel rigidly secured to said shaft and a co-operating pawl member mounted on said supporting means for limiting the direction of rotation of said ratchet when in engagement therewith.

2. In a tire spreading device, the combination comprising a frame, opposing roller-supporting means carried thereby, a plurality of rollers carried by each of the opposing roller-supporting means and so disposed as to normally lie in alinement with each other, means, including a handle and a clutch, for effecting the alinement of said rollers for admitting the insertion of same between the opposing beads of a tire shoe and for effecting the optional separation of the roller-supporting means with respect to each other when said rollers have been so inserted into a tire shoe.

3. In a tire spreader, the combination comprising a hollow frame, a plurality of opposing U-shaped roller-supporting plates slidably secured thereto, a plurality of rollers carried by each of said plates and so disposed thereon as to normally lie in alinement with each other when said plates are in a normal unseparated relation with respect to each other, a pair of opposing rack members slidably mounted on said frame, a co-operating pinion mounted intermediate said rack members and adapted to at all times mesh therewith, a shaft connected to and rotatable with said pinion, a ratchet wheel secured to said shaft and rotatable therewith, a handle loosely mounted on said shaft and a clutch mechanism for locking said shaft and said handle in engagement with each other.

4. In a tire spreading device, the combination comprising a pair of roller-supporting means and means for effecting to and fro movement thereof with respect to each other, a plurality of rollers secured to each of said supporting means in such a manner that when said roller-supporting means are brought into the closest proximity that it is possible to position the same within the limits of the to and fro motion thereof, the vertical axes of said rollers will lie substantially in the same vertical plane and in substantial parallelism with each other.

ROBERT J. TENNIS.